(12) United States Patent
Whillock et al.

(10) Patent No.: US 9,020,208 B2
(45) Date of Patent: Apr. 28, 2015

(54) SYSTEM AND METHOD FOR ANONYMOUS BIOMETRICS ANALYSIS

(75) Inventors: Rand P. Whillock, North Oaks, MN (US); Gary Edward Determan, Maple Grove, MN (US); Vincent Jacobson, Eden Prairie, MN (US); Sharath Venkatesha, Golden Valley, MN (US); Pedro Davalos, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 230 days.

(21) Appl. No.: 13/182,310

(22) Filed: Jul. 13, 2011

(65) Prior Publication Data

US 2013/0016883 A1 Jan. 17, 2013

(51) Int. Cl.
G06K 9/00 (2006.01)
G06F 21/32 (2013.01)

(52) U.S. Cl.
CPC ........ *G06K 9/00* (2013.01); *G06F 21/32* (2013.01); *G06K 9/00885* (2013.01)

(58) Field of Classification Search
None
See application file for complete search history.

(56) References Cited

U.S. PATENT DOCUMENTS

| | | | | |
|---|---|---|---|---|
| 4,729,128 | A * | 3/1988 | Grimes et al. | 382/116 |
| 6,072,891 | A * | 6/2000 | Hamid et al. | 382/116 |
| 7,314,164 | B2 * | 1/2008 | Bonalle et al. | 235/380 |
| 8,473,277 | B2 * | 6/2013 | Jephcott | 704/3 |
| 2002/0091937 | A1 * | 7/2002 | Ortiz | 713/200 |
| 2002/0112177 | A1 * | 8/2002 | Voltmer et al. | 713/200 |
| 2004/0020982 | A1 * | 2/2004 | Hoffman et al. | 235/379 |
| 2005/0220326 | A1 * | 10/2005 | Sim | 382/118 |
| 2006/0021003 | A1 * | 1/2006 | Fisher et al. | 726/1 |
| 2006/0222210 | A1 * | 10/2006 | Sundaram | 382/115 |
| 2006/0239512 | A1 * | 10/2006 | Petrillo | 382/115 |

(Continued)

OTHER PUBLICATIONS

Ballard, Lucas, et al. "Towards practical biometric key generation with randomized biometric templates." Proceedings of the 15th ACM conference on Computer and communications security. ACM, 2008.*

(Continued)

*Primary Examiner* — Stephen R Koziol
*Assistant Examiner* — Sean Conner
(74) *Attorney, Agent, or Firm* — Schwegman, Lundberg & Woessner, P.A.

(57) ABSTRACT

A system receives an identification number from a subject. The system retrieves a biometric measurement from a database using the identification number. The database includes biometric measurements of a plurality of subjects. Each biometric measurement is determined from a location of a particular subject's body, each biometric measurement is associated with a particular identification number, and each particular identification number is associated with a particular subject. When the use of the identification number results in a retrieval of a biometric measurement from the biometric database, the system searches a plurality of locations on the subject and takes biometric measurements at the locations, compares the retrieved biometric measurement from the biometric database with the biometric measurements of the subject, and indicates that the retrieved biometric measurement from the biometric database matches one or more of the biometric measurements from the subject or that the retrieved biometric measurement from the biometric database does not match any of the biometric measurements from the subject. In an embodiment, the system is used for verification purposes, not identification purposes.

20 Claims, 4 Drawing Sheets

(56) References Cited

U.S. PATENT DOCUMENTS

| | | | |
|---|---|---|---|
| 2008/0037833 A1* | 2/2008 | Takahashi et al. | 382/115 |
| 2008/0212846 A1* | 9/2008 | Yamamoto et al. | 382/115 |
| 2009/0309698 A1* | 12/2009 | Headley et al. | 340/5.52 |
| 2010/0071031 A1* | 3/2010 | Carter et al. | 726/2 |
| 2011/0205016 A1* | 8/2011 | Al-Azem et al. | 340/5.52 |
| 2013/0015946 A1* | 1/2013 | Lau et al. | 340/5.2 |

OTHER PUBLICATIONS

Prabhakar, S.; Pankanti, S.; Jain, A.K., "Biometric recognition: security and privacy concerns," Security & Privacy, IEEE, vol. 1, No. 2, pp. 33,42, Mar.-Apr. 2003.*

Farooq, F.; Bolle, R.M.; Tsai-Yang Jea; Ratha, N., "Anonymous and Revocable Fingerprint Recognition," Computer Vision and Pattern Recognition, 2007. CVPR '07. IEEE Conference pp. 1, 7, 17-22. Jun. 2007.*

Cavoukian, A., Stoianov, A. and Carter, F., 2008, in IFIP International Federation for Information Processing, vol. 261; Policies and Research in Identity Management; Eds. E. de Leeuw, Fischer-Hübner, S., Tseng, J., Borking, J.; (Boston: Springer), pp. 57-77.*

Alliance, SmartCard. "Smart Cards and Biometrics." 2011.*

Wayman, James, et al. "An introduction to biometric authentication systems." Biometric Systems. Springer London, 2005. 1-20.*

Jain, Anil K., Arun Ross, and Salil Prabhakar. "An introduction to biometric recognition." Circuits and Systems for Video Technology, IEEE Transactions on 14.1 (2004): 4-20.*

Miller, Philip E., et al. "Personal identification using periocular skin texture." Proceedings of the 2010 ACM Symposium on Applied Computing. ACM, 2010.*

* cited by examiner

SYSTEM AND METHOD FOR ANONYMOUS BIOMETRICS ANALYSIS

TECHNICAL FIELD

The present disclosure relates to a system and method for anonymous biometric analysis.

BACKGROUND

The proliferation of biometric devices is causing concerns about privacy and potential misuse of biometric signatures. Once a person has given up their raw biometric signature, they have lost control of it and cannot prevent it from being used for tasks other than the intended purpose. This concern can impede the public adoption of biometric security devices. Existing solutions typically look at encryption of biometric signatures in ways that support matching but that allow the user to revoke or control how the biometric signatures are used. Most of these systems require a user password, a shared secret such as a private key, or a trusted secure database. These systems also require some level of trust that the verification system will use their biometric templates only for the intended purpose. There is therefore still a need for a biometric template and identification process that cannot be misused.

DETAILED DESCRIPTION

In light of the state of the art, a technology that could assure that a biometric signature was used only for verification, rather than for general matching, would be an enhancement to the privacy of biometrics and aid in the public acceptance of biometric systems. Consequently, in an embodiment, a biometric obtained is generic enough so as to match and verify a person who presents the same signature, but is not by itself a signature which can be used to identify a person. This idea refers to the anonymity of the biometric signature. The use of an identification number gives a clue to verify the person, and this is substantiated by matching the biometric signature from the person. The anonymous nature of the biometric does away with the privacy concerns of many other specific biometrics like iris and face, which can be used to identify a person. The idea implements an enhanced biometric verification procedure.

A characteristic of biometrics that an embodiment exploits is that there are an infinite number of measurements one could make on the human body to provide a biometric feature. Therefore, an embodiment presents a top level design concept for a biometric system that exploits the fact that there are a very large number of potential biometric features to prevent unintended use of the biometric. Such a biometric system supports one to one verification, but it cannot be used for one to many matching against a large database. This "anonymous" biometric signature will tell a system that this particular person is the same person that enrolled with the template, but it cannot be used to "identify" the person by matching to any other databases.

This biometric approach of an embodiment changes the way traditional matching and searching is done. A traditional biometric verification system is given a biometric template and it searches a stored database to see if the signature matches any of the stored templates. In contrast, an embodiment searches for the biometric signature on the human subject to verify if a specific signature could have come from the subject. The verification task entails a process of searching the subject for the provided signature.

An embodiment can be used for a number of types of biometrics. However, for description purposes, a skin texture based biometric will be described. The system uses a skin texture based biometric that computes features based on a patch of skin imaged from a location on the subject's face. The specific patch location is selected randomly, but the selection is guided by heuristics to assure that the patch contains adequate texture information for a sample and that the location will not change over time. Since the patch location is pseudorandom, it will be different for each subject.

A biometrics template for the subject is built using texture measures over the selected patch. The template is then stored in a database indexed by a subject identification number. For verification, the subject presents his or her identification number, and the system uses it to access his or her stored biometric template. The system then verifies that it is in fact his or her template by searching for the biometrics signature on the subject in real time. If the template (for example a skin patch) matches the signature for any location on the subject, the match is verified that the subject is who they claim to be. If the template does not match any location on the subject, his or her identity is not verified. Since the stored biometrics in the database are from random locations on the subjects, they cannot be compared to each other or be compared to signatures from other databases. The templates are only useful for verification when a live subject is presented for verification.

Figure 1:
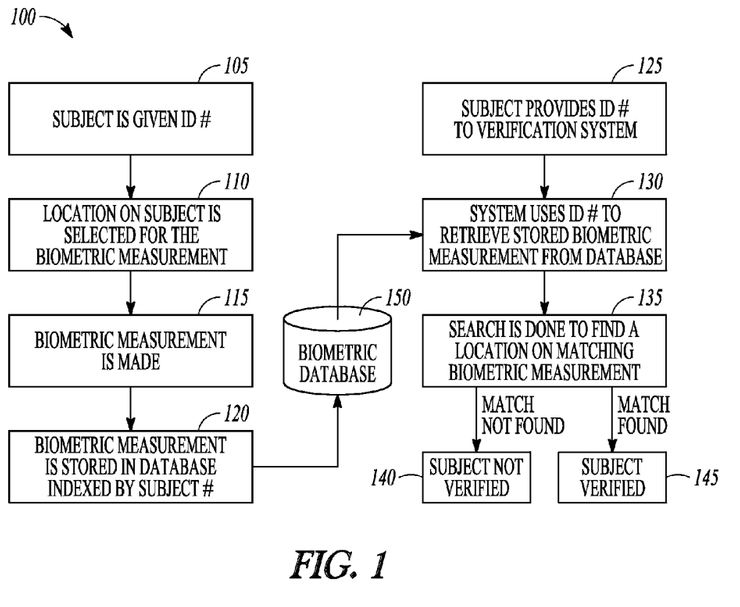
FIG. 1 is a flowchart of an example embodiment of an anonymous biometric analysis.
Figure 2A:
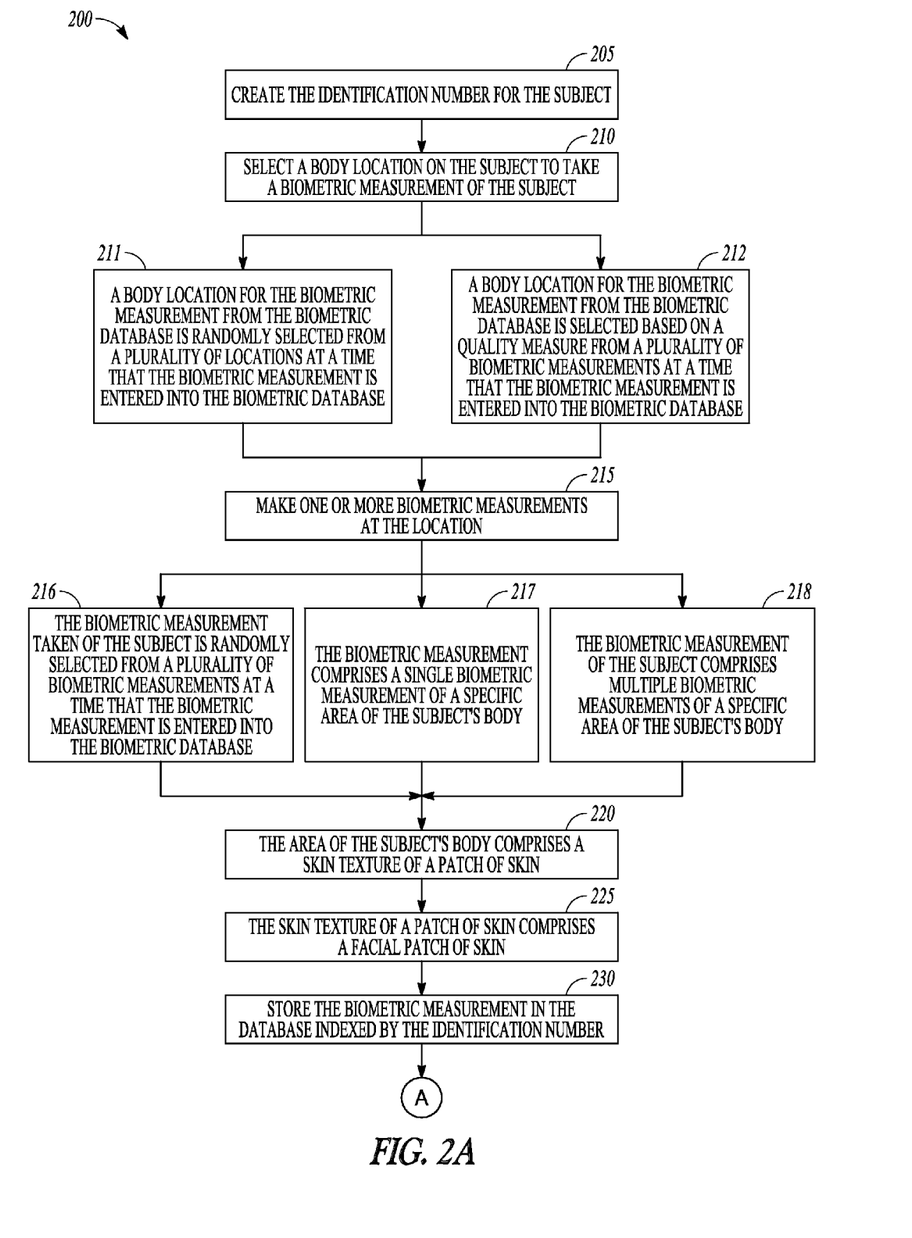
FIG. 2A is a flowchart of an example embodiment of an enrollment process and FIG. 2B is a flowchart of an example embodiment of a verification process for use in connection with an anonymous biometric analysis.
Figure 2B:
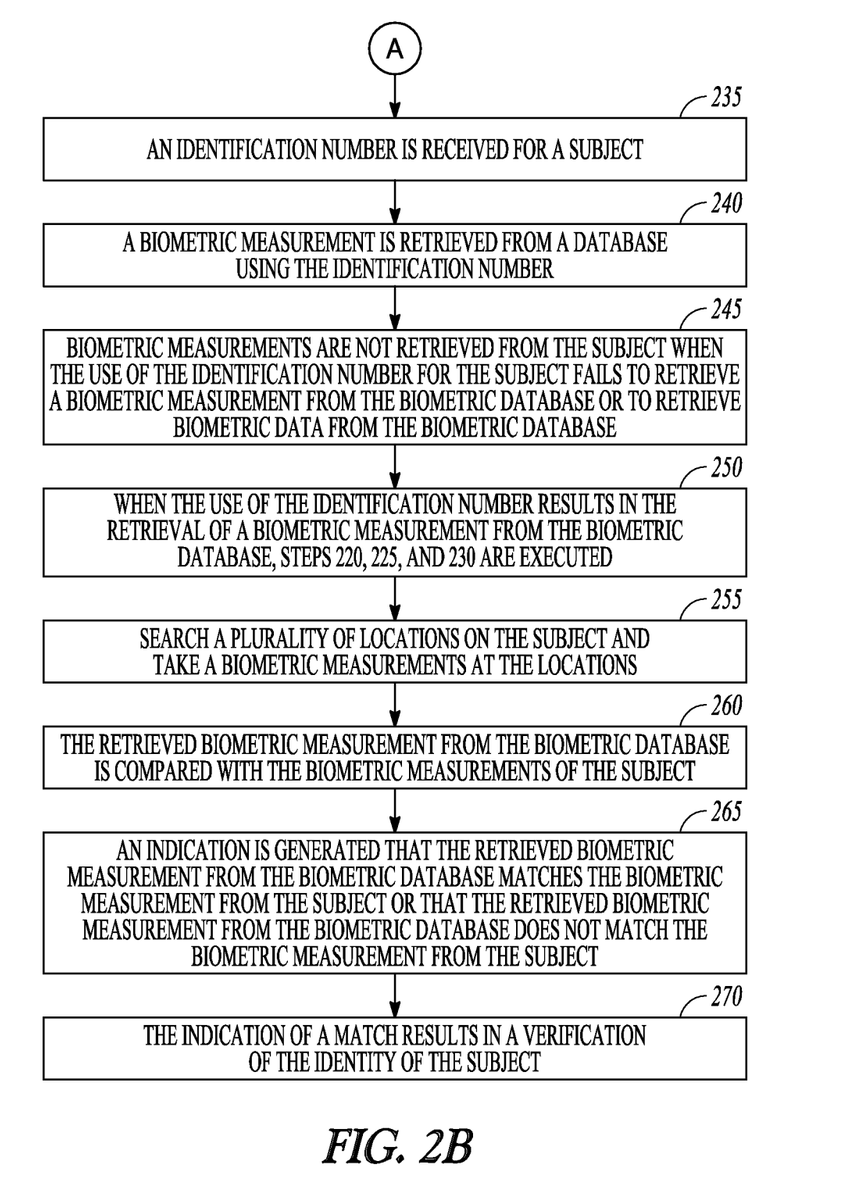

FIGS. 1, 2A, and 2B are flowcharts of example processes 100 and 200 for anonymous biometric analyses. FIGS. 1, 2A, and 2B include a number of process blocks 105-150, 205-230, and 235-270. Though arranged serially in the examples of FIGS. 1, 2A, and 2B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 1, the process 100 includes an enrollment portion and a verification portion. The enrollment portion includes steps 105-120. At 105, the person or subject is provided with an identification number. At 110, a location on the subject is selected for the biometric measurement, and at 115, the biometric measurement is collected. At 120, the biometric measurement is stored in database 150. The biometric measurement is indexed in the database by the subject identification number. The verification portion includes steps 125-145. At 125, the subject provides his or her identification number to the system. At 130, the system uses the identification number to retrieve the stored biometric measurement from the database 150. At 135, a search is done to find a location of the subject that matches the biometric measurement. At 140, the subject is not verified because a match is not found. At 145, the subject is verified because a match is found.

Referring to the enrollment process of FIG. 2A, at 205, an identification number is created for a subject. At 210, a body location on the subject is selected to take a biometric measurement of the subject. Blocks 211 and 212 are alternatives and disclose more detail for the features of block 210. Specifically, at 211, a body location for the biometric measurement from the biometric database is randomly selected from a plurality of locations at a time that the biometric measurement is entered into the biometric database. This is the biometric measurement taken at enrollment time that is stored in the database for the subject. At 212, a body location for the biometric measurement from the biometric database is selected based on a quality measure from a plurality of biometric measurements at a time that the biometric measurement is entered into the biometric database. For example, the system may be able to determine, or it may be known, that biometric measurements of the subject's eye will be of a higher quality and provide more reliable information than biometric measurements of the subject's facial skin. Consequently, the subject's eye biometrics will be used instead of the subject's skin biometrics.

At 215, one or more biometric measurements are made at the location. Blocks 216, 217, and 218 are alternatives and disclose more detail for the features of block 215. Specifically, at 216, the biometric measurement taken of the subject is randomly selected from a plurality of biometric measurements at a time that the biometric measurement is entered into the biometric database. This is the biometric measurement that is taken at verification time and that is compared to the biometric measurement that was stored in the database. At 217, the biometric measurement of the subject comprises a single biometric measurement of a specific area of the subject's body. At 218, the biometric measurement of the subject comprises multiple biometric measurements of a specific area of the subject's body.

At 220, the location on the subject comprises a skin texture of a patch of skin, at 225, the skin texture of a patch of skin comprises a facial patch of skin. At 230, the biometric measurement is stored in the database indexed by the identification number.

Referring to the verification process of FIG. 2B, at 235, an identification number is received from a subject. At 240, a biometric measurement is retrieved from a database using the identification number. The biometric database includes biometric measurements of a plurality of subjects. Each biometric measurement is determined from a location of a particular subject's body, each biometric measurement is associated with a particular identification number, and each particular identification number is associated with a particular subject. At 245, biometric measurements are not retrieved from the subject when the use of the identification number for the subject fails to retrieve a biometric measurement from the biometric database or to retrieve biometric data from the biometric database. At 250, when the use of the identification number results in a retrieval of a biometric measurement from the biometric database, the following three steps are executed. At 255, a plurality of locations on the subject is searched and biometric measurements are taken at the locations. At 260, the retrieved biometric measurement from the biometric database is compared with the biometric measurements of the subject. And at 265, an indication is provided that the retrieved biometric measurement from the biometric database matches one or more of the biometric measurements from the subject or that the retrieved biometric measurement from the biometric database does not match any of the biometric measurements from the subject. At 270, the indication of a match results in a verification of the identity of the subject.

Figure 3:
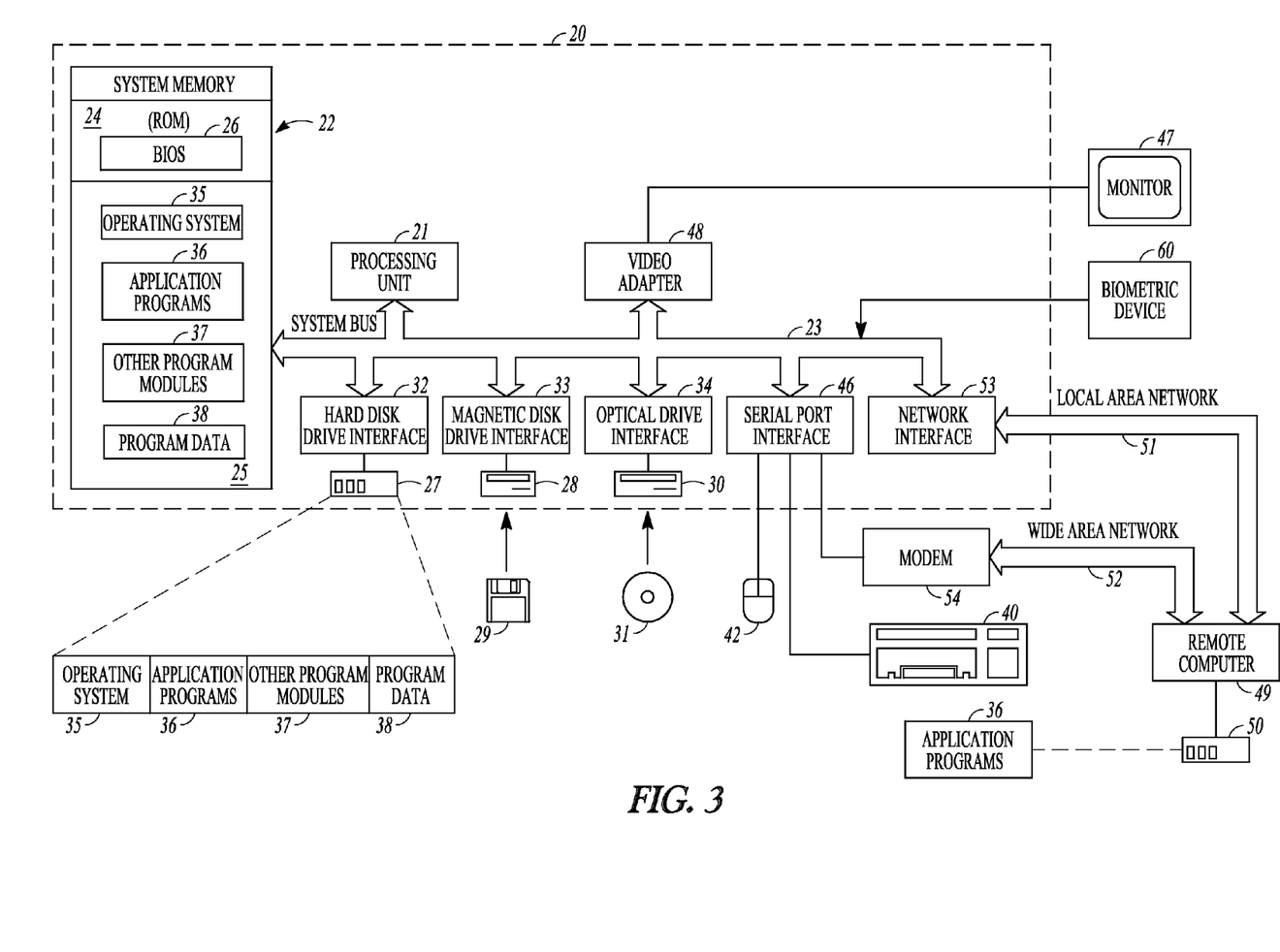
FIG. 3 is a block diagram of a computer system upon which one or more embodiments may execute.

FIG. 3 is an overview diagram of a hardware and operating environment in conjunction with which embodiments of the invention may be practiced. The description of FIG. 3 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 3, a hardware and operating environment is provided that is applicable to any of the servers and/or remote clients shown in the other Figures.

As shown in FIG. 3, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/0 relative to the computer 20, although only a memory storage device 50 has been illustrated. The logical connections depicted in FIG. 3 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art. Biometric device 60 is coupled to processing unit 21 via system bus 23, and can include ocular biometric devices, skin texture devices, body dimension devices, etc.

EXAMPLE EMBODIMENTS

Example No. 1 is a system including a computer processor configured to receive an identification number from a subject. The system is configured to retrieve a biometric measurement from a database using the identification number, wherein the database comprises biometric measurements of a plurality of subjects, wherein each biometric measurement is determined from a location of a particular subject's body, wherein each biometric measurement is associated with a particular identification number, and wherein each particular identification number is associated with a particular subject. When the use of the identification number results in a retrieval of a biometric measurement from the biometric database, the system searches a plurality of locations on the subject and takes biometric measurements at the locations, compares the retrieved biometric measurement from the biometric database with the biometric measurements of the subject, and indicates that the retrieved biometric measurement from the biometric database matches one or more of the biometric measurements from the subject or that the retrieved biometric measurement from the biometric database does not match any of the biometric measurements from the subject.

Example No. 2 includes the features of Example No. 1 and optionally includes a system configured to create the identification number for the subject, select a body location on the subject from which to take a biometric measurement of the subject, make one or more biometric measurements at the location, and store the biometric measurement in the database indexed by the identification number.

Example No. 3 includes the features of Example Nos. 1-2 and optionally includes a system wherein a body location for the biometric measurement from the biometric database is randomly selected from a plurality of locations at a time that the biometric measurement is entered into the biometric database.

Example No. 4 includes the features of Example Nos. 1-3 and optionally includes a system wherein the biometric measurement taken of the subject is randomly selected from a plurality of biometric measurements at a time that the biometric measurement is entered into the biometric database.

Example No. 5 includes the features of Example Nos. 1-4 and optionally includes a system wherein a body location for the biometric measurement from the biometric database is selected based on a quality measure from a plurality of biometric measurements at a time that the biometric measurement is entered into the biometric database.

Example No. 6 includes the features of Example Nos. 1-5 and optionally includes a system wherein the biometric measurement of the subject comprises a single biometric measurement of a specific area of the subject's body.

Example No. 7 includes the features of Example Nos. 1-6 and optionally includes a system wherein the biometric measurement of the subject comprises multiple biometric measurements of a specific area of the subject's body.

Example No. 8 includes the features of Example Nos. 1-7 and optionally includes a system wherein the indication of a match results in a verification of the identity of the subject.

Example No. 9 includes the features of Example Nos. 1-8 and optionally includes a system configured to not retrieve biometric measurements from the subject when the use of the identification number for the subject fails to retrieve a biometric measurement from the biometric database or to retrieve biometric data from the biometric database.

Example No. 10 includes the features of Example Nos. 1-9 and optionally includes a system wherein the location on the subject comprises a skin texture of a patch of skin.

Example No. 11 includes the features of Example Nos. 1-10 and optionally includes a system wherein the skin texture of a patch of skin comprises a facial patch of skin.

Example No. 12 includes the features of Example Nos. 1-11 and optionally includes a system configured to execute on different processors sharing a common database or copies of the same database.

Example No. 13 is a method comprising receiving an identification number from a subject, retrieving a biometric measurement from a database using the identification number, wherein the database comprises biometric measurements of a plurality of subjects, wherein each biometric measurement is determined from a location of a particular subject's body, wherein each biometric measurement is associated with a particular identification number, and wherein each particular identification number is associated with a particular subject, and when the use of the identification number results in a retrieval of a biometric measurement from the biometric database, searching a plurality of locations on the subject and taking biometric measurements at the locations, comparing the retrieved biometric measurement from the biometric database with the biometric measurements of the subject, and indicating that the retrieved biometric measurement from the biometric database matches one or more of the biometric measurements from the subject or that the retrieved biometric measurement from the biometric database does not match any of the biometric measurements from the subject.

Example No. 14 includes the features of Example No. 13 and optionally includes creating the identification number for the subject, selecting a body location on the subject to take a biometric measurement of the subject, making one or more biometric measurements at the location, and storing the biometric measurement in the database indexed by the identification number.

Example No. 15 includes the features of Example Nos. 13-14 and optionally includes a method wherein the indication of a match results in a verification of the identity of the subject.

Example No. 16 includes the features of Example Nos. 13-15 and optionally includes a process that does not retrieve biometric measurements from the subject when the use of the identification number for the subject fails to retrieve a biometric measurement from the biometric database or to retrieve biometric data from the biometric database.

Example No. 17 includes the features of Example Nos. 13-16 and optionally includes a process wherein the location on the subject comprises a skin texture of a patch of skin.

Example No. 18 includes the features of Example Nos. 13-17 and optionally includes a process wherein the skin texture of a patch of skin comprises a facial patch of skin.

Example No. 19 is a computer readable medium comprising instructions that when executed by a processor execute a process comprising receiving an identification number from a subject, retrieving a biometric measurement from a database using the identification number, wherein the database comprises biometric measurements of a plurality of subjects, wherein each biometric measurement is determined from a location of a particular subject's body, wherein each biometric measurement is associated with a particular identification number, and wherein each particular identification number is associated with a particular subject, and when the use of the identification number results in a retrieval of a biometric measurement from the biometric database, searching a plurality of locations on the subject and taking biometric measurements at the locations, comparing the retrieved biometric measurement from the biometric database with the biometric measurement of the subject, and indicating that the retrieved biometric measurement from the biometric database matches one or more of the biometric measurements from the subject or that the retrieved biometric measurement from the biometric database does not match any of the biometric measurements from the subject.

Example No. 20 includes the features of Example No. 19 and optionally includes instructions for creating the identification number for the subject, selecting a body location on the subject to take a biometric measurement of the subject, making one or more biometric measurements at the location, and storing the biometric measurement in the database indexed by the identification number.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
   a computer processor configured to:
      receive an identification number from a subject;
      select a plurality of body locations on the subject at which to take biometric measurements of the subject and store the biometric measurements in a database, wherein the body locations are selected randomly;
      retrieve a biometric measurement from the database using the identification number, wherein the database comprises biometric measurements of a plurality of subjects, wherein each biometric measurement is determined from a location of a particular subject's body, wherein each biometric measurement is associated with a particular identification number, and wherein each particular identification number is associated with a particular subject; and
      when the use of the identification number results in a retrieval of the biometric measurement from the database, wherein the retrieved biometric measurement from the database is from a random location on the subject such that the retrieved biometric measurement cannot be used to identify the subject by matching to any other databases, anonymously analyze the biometric measurements by:

searching the plurality of body locations on the subject and taking biometric measurements at the locations such that any biometric measurement taken from the subject is generic and can verify the subject as one who previously presented the biometric measurement for storage in the system, and such that none of the biometric measurements taken from the subject can function as a signature to identify the subject;

comparing the retrieved biometric measurement from the database with the biometric measurements of the subject; and indicating that the retrieved biometric measurement from the database matches one or more of the biometric measurements from the subject or that the retrieved biometric measurement from the database does not match any of the biometric measurements from the subject.

2. The system of claim 1, comprising:
a computer processor configured to:
create the identification number for the subject;
select a body location on the subject to take a biometric measurement of the subject;
make one or more biometric measurements at the location; and
store the biometric measurement in the database indexed by the identification number.

3. The system of claim 2, wherein a body location for the biometric measurement from the database is randomly selected from a plurality of locations at a time that the biometric measurement is entered into the database.

4. The system of claim 2, wherein the biometric measurement taken of the subject is randomly selected from a plurality of biometric measurements at a time that the biometric measurement is entered into the database.

5. The system of claim 2, wherein a body location for the biometric measurement from the database is selected based on a quality measure from a plurality of biometric measurements at a time that the biometric measurement is entered into the biometric database.

6. The system of claim 2, wherein the biometric measurement of the subject comprises a single biometric measurement of a specific area of the subject's body.

7. The system of claim 2, wherein the biometric measurement of the subject comprises multiple biometric measurements of a specific area of the subject's body.

8. The system of claim 1, wherein the indication of a match results in a verification of the identity of the subject.

9. The system of claim 1, configured to not retrieve biometric measurements from the subject when the use of the identification number for the subject fails to retrieve a biometric measurement from the database or to retrieve biometric data from the database.

10. The system of claim 1, wherein the location on the subject comprises a skin texture of a patch of skin.

11. The system of claim 10, wherein the skin texture of a patch of skin comprises a facial patch of skin.

12. The system of claim 2, wherein the system is configured to execute on different processors sharing a common database or copies of the same database.

13. A process comprising:
receiving an identification number from a subject;
selecting a plurality of body locations on the subject at which to take biometric measurements of the subject and storing the biometric measurements in a database, wherein the body locations are selected randomly;
retrieving a biometric measurement from the database using the identification number, wherein the database comprises biometric measurements of a plurality of subjects, wherein the biometric measurements are determined from random locations of a particular subject's body, wherein each biometric measurement is associated with a particular identification number, and wherein each particular identification number is associated with a particular subject; and when the use of the identification number results in a retrieval of the biometric measurement from the database, wherein the retrieved biometric measurement from the database is from a random location on the subject such that the retrieved biometric measurement cannot be used to identify the subject by matching to any other databases, anonymously analyze the biometric measurements by:

searching the plurality of body locations on the subject and taking biometric measurements at the locations such that any biometric measurement taken from the subject is generic and can verify the subject as one who previously presented the biometric measurement for storage in the system, and such that none of the biometric measurements taken from the subject can function as a signature to identify the subject;

comparing the retrieved biometric measurement from the database with the biometric measurements of the subject; and indicating that the retrieved biometric measurement from the database matches one or more of the biometric measurements from the subject or that the retrieved biometric measurement from the database does not match any of the biometric measurements from the subject.

14. The process of claim 13, comprising:
creating the identification number for the subject;
selecting a body location on the subject to take a biometric measurement of the subject;
making one or more biometric measurements at the location; and
storing the biometric measurement in the database indexed by the identification number.

15. The process of claim 13, wherein the indication of a match results in a verification of the identity of the subject.

16. The process of claim 13, comprising not retrieving biometric measurements from the subject when the use of the identification number for the subject fails to retrieve a biometric measurement from the database or to retrieve biometric data from the database.

17. The process of claim 13, wherein the location on the subject comprises a skin texture of a patch of skin.

18. The process of claim 17, wherein the skin texture of a patch of skin comprises a facial patch of skin.

19. A non-transitory computer readable medium comprising instructions that when executed by a processor execute a process comprising:
receiving an identification number from a subject;
selecting a plurality of body locations on the subject at which to take biometric measurements of the subject and storing the biometric measurements in a database, wherein the body locations are selected randomly;
retrieving a biometric measurement from the database using the identification number, wherein the database comprises biometric measurements of a plurality of subjects, wherein each biometric measurement is determined from a location of a particular subject's body, wherein each biometric measurement is associated with a particular identification number, and wherein each particular identification number is associated with a particular subject; and when the use of the identification number results in a retrieval of a biometric measurement from the database, wherein the retrieved biometric measurement from the database is from a random location on the subject such that the retrieved biometric measurement cannot be used to identify the subject by matching to any other databases, anonymously analyze the biometric measurements by:

searching the plurality of body locations on the subject and taking biometric measurements at the locations such that any biometric measurement taken from the subject is generic and can verify the subject as one who previously presented the biometric measurement for storage in the system, and such that none of the biometric measurements taken from the subject can function as a signature to identify the subject;

comparing the retrieved biometric measurement from the database with the biometric measurements of the subject; and indicating that the retrieved biometric measurement from the database matches one or more of the biometric measurements from the subject or that the retrieved biometric measurement from the database does not match any of the biometric measurements from the subject.

20. The non-transitory computer readable medium of claim 19, comprising instructions for:

creating the identification number for the subject;

selecting a body location on the subject to take a biometric measurement of the subject;

making one or more biometric measurements at the location; and storing the biometric measurement in the database indexed by the identification number.

* * * * *